US 6,590,413 B1

(12) United States Patent
Yang

(10) Patent No.: US 6,590,413 B1
(45) Date of Patent: Jul. 8, 2003

(54) SELF-TRACKING INTEGRATED DIFFERENTIAL TERMINATION RESISTANCE

(75) Inventor: Hai-Gang Yang, Workingham (GB)

(73) Assignee: Altera Corporation, San Jose, CA (US)

( * ) Notice: Subject to any disclaimer, the term of this patent is extended or adjusted under 35 U.S.C. 154(b) by 0 days.

(21) Appl. No.: 10/056,759

(22) Filed: Jan. 22, 2002

Related U.S. Application Data

(60) Provisional application No. 60/327,114, filed on Oct. 3, 2001.

(51) Int. Cl.$^7$ .................................................. H03K 17/16
(52) U.S. Cl. ............................ 326/30; 326/86; 327/108
(58) Field of Search ............................. 326/30, 57, 58, 326/86; 327/108, 313, 327, 328; 333/17.3

(56) References Cited

U.S. PATENT DOCUMENTS

| 5,164,663 | A | | 11/1992 | Alcorn |
| 5,359,235 | A | | 10/1994 | Coyle et al. |
| 5,374,861 | A | | 12/1994 | Kubista |
| 5,726,583 | A | | 3/1998 | Kaplinsky |
| 5,864,715 | A | | 1/1999 | Zani et al. |
| 5,955,911 | A | | 9/1999 | Drost et al. |
| 6,008,665 | A | | 12/1999 | Kalb et al. |
| 6,026,456 | A | | 2/2000 | Ilkbahar |
| 6,037,798 | A | | 3/2000 | Hedberg |
| 6,087,847 | A | | 7/2000 | Mooney et al. |
| 6,097,208 | A | * | 8/2000 | Okajima et al. ............... 326/26 |
| 6,100,713 | A | | 8/2000 | Kalb et al. |
| 6,154,060 | A | * | 11/2000 | Morriss ........................ 326/86 |
| 6,157,206 | A | | 12/2000 | Taylor et al. |
| 6,181,157 | B1 | * | 1/2001 | Fiedler ........................ 326/30 |
| 6,329,836 | B1 | | 12/2001 | Drost et al. |
| 6,362,644 | B1 | | 3/2002 | Jeffery et al. |
| 6,411,126 | B1 | * | 6/2002 | Tinsley et al. ................ 326/83 |
| 6,448,813 | B2 | * | 9/2002 | Garlepp et al. ............... 326/83 |

OTHER PUBLICATIONS

*LVDS I/O Interface for Gb/s–per–Pin Operation in 0.35–μm CMOS,* Boni, et al., IEEE Journal of Solid–State Circuits, vol. 36, No. 4, Apr. 2001.
*CMOS VLSI Implementation of Gigabyte/Second Computer Network Links,* Bendak et al., Dept. of Electrical and Computer Engineering, University of California at San Diego, La Jolla, CA 92093–0407, IEEE International Symposium on Circuits and Systems, 1996.

* cited by examiner

Primary Examiner—Michael Tokar
Assistant Examiner—Vibol Tan
(74) Attorney, Agent, or Firm—Babak S. Sani; Townsend and Townsend and Crew LLP

(57) ABSTRACT

Method and circuitry for implementing an integrated differential termination resistance that is self-tracking. The invention employs a mechanism that automatically tracks variations on a number of circuit and signal parameters including input common-mode voltage, as well as varying device characteristics due to fluctuations in processing, power supply voltage and temperature. It then adjusts the resistance across the two differential input signals in a self-calibrating manner to obtain a substantially constant termination resistance for a given application.

21 Claims, 3 Drawing Sheets

SELF-TRACKING INTEGRATED DIFFERENTIAL TERMINATION RESISTANCE

This application claims benefit of provisional application No. 60/327,114 filed Oct. 3, 2001.

BACKGROUND OF THE INVENTION

The present invention relates in general to integrated circuitry, and in particular to methods and circuitry for implementing integrated differential termination resistance with a self-tracking feature that results in a relatively constant resistance value.

Advances in semiconductor processing technology and high speed circuit techniques have made gigabits per second (Gb/s) data rates possible at the integrated circuit level. At the same time reduction in power consumption continues to be a great concern not only for battery-operated portable systems, but for reduction of overall system costs related to packaging and cooling systems. This combination poses a challenging task for the circuit designer, especially when it comes to the interface circuitry. Various data signaling approaches have been developed to address some of these concerns. Low-voltage differential signaling (LVDS), for example, is one signaling technique that provides a low-power, low-voltage and high-speed alternative. LVDS, however, places relatively stringent requirements on the tolerance affecting the input/output (I/O) levels. It requires, for example, that the input termination resistance to stay relatively constant within ±10% of tolerance and under a specific operating range. Termination is needed to prevent unwanted reflections that would corrupt the signal when transmitting signals over distances appreciable with respect to the signal period. It is desirable to provide a self-terminating circuit that incorporates the termination resistance on the same integrated circuit for a more cost-efficient implementation.

To implement such an integrated resistor in the LVDS input buffer using a standard CMOS process technology has been a challenging task and the focus of many research efforts. One approach uses appropriate passive devices such as diffusion or implant resistors, but suffers from process variations, which is normally greater than 15% in both directions. The use of a relatively higher accuracy polysilicon resistor may be restricted as the oxide layer under the polysilicon may not sustain a specified electrostatic discharge (ESD) at an LVDS receiver's inputs. Another approach employs active circuits including pass transistors or transmission gates. The on-resistance of the transistors, however, fluctuates which makes it difficult to meet the relatively wide range of input common-mode voltage level (0 to 2.4V). The on-resistance of the devices is also influenced by the fluctuations in processing, power supply voltage and temperature. Improvements in this regard have been made through dynamic on-chip trimming, but that has also come at the expense of more complexity and device overhead.

There is therefore a need to implement a relatively constant integrated termination resistor that satisfies the requirements of differential signaling with minimum circuit complexity.

BRIEF SUMMARY OF THE INVENTION

The present invention addresses problems associated with implementation of an integrated termination resistor required by differential interconnect signaling technologies such as LVDS. In a specific embodiment, the invention presents a circuit technique for implementing a self-tracking differential termination resistor in standard CMOS process technology. The circuit employs a mechanism that automatically tracks variations on input common-mode voltage level as well as varying device characteristics due to fluctuations in processing, power supply voltage and temperature. It then adjusts the resistance across the two differential input signals in a self-calibrating manner to obtain a substantially constant termination resistance for a given application. In a specific embodiment, the actual resistance is defined with an external reference resistor, independent of other operating conditions.

Accordingly, in one embodiment, the present invention provides an integrated differential termination resistance coupled between a first node and a second node, including: a first resistive element coupled to the first node; a first field effect transistor (FET) coupled between the first resistive element and a common node; a second resistive element coupled to the second node; a second FET coupled between the second resistive element and the common node, wherein source terminals of the first and second FETs couple to the common node; and a termination control circle coupled to gate terminals of the first and second FETs and the common node, and configured to track variations in a resistance value of the termination resistance and to compensate for the variations by adjusting a control voltage at the gate terminals of the first and second FETs. In a more specific embodiment, the termination control circuit includes a replica biasing circuit that adjusts the value of the control voltage in response to variations in a common-mode voltage at the common node.

In another embodiment, the present invention provides a method of implementing a differential termination resistance including coupling source and drain terminals of a field effect transistor (FET) across differential terminals, respectively; operating the FET in a triode region such that its channel provides an adjustable termination resistance; tracking variations in a nominal value of the termination resistance via a replica termination resistance; and adjusting a resistance value of the FET by varying a gate voltage of the FET to compensate for the variations.

The following detailed description and the accompanying drawings provide a better understanding of the nature and advantages of the self-tracking integrated differential termination according to the present invention.

DETAILED DESCRIPTION OF THE INVENTION

Figure 1:
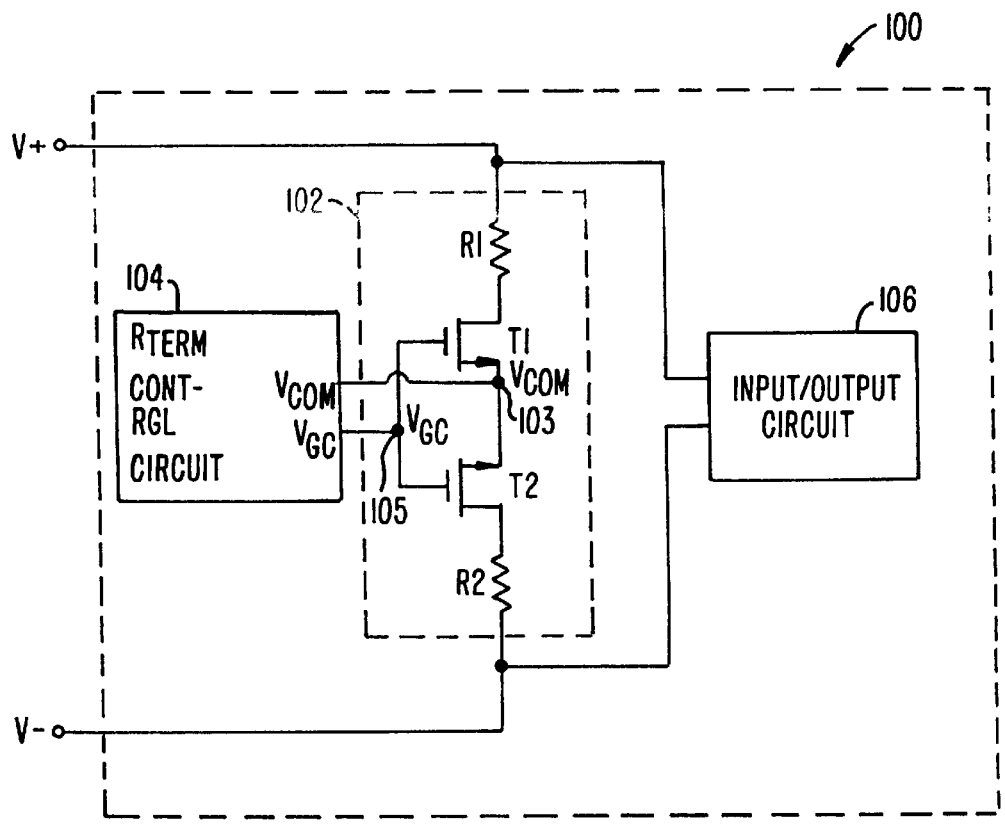
FIG. 1 depicts one implementation of a termination resistor according to an exemplary embodiment of the present invention.

The present invention provides various embodiments for implementing an integrated self-tracking differential termination resistance. Referring to FIG. 1, there is shown an integrated circuit 100 that includes a termination resistor $R_{TERM}$ 102 connected across differential terminals V+ and V−. In the exemplary embodiment shown in FIG. 1, $R_{TERM}$ 102 includes two serially-connected n-type transistors T1 and T2 that respectively connect to V+ and V− via resistive elements R1 and R2 in a symmetrical fashion as shown. Resistive elements R1 and R2 are passive resistors made of, for example, diffused or implanted material. Transistors T1 and T2 are preferably identical in size and formation as are resistors R1 and R2. The source terminals of transistors T1 and T2 connect together at node 103 and carry a common mode signal $V_{COM}$, while the gate terminals of transistors T1 and T2 are shorted together at node 105 driven by a gate control signal $V_{GC}$. A control circuit 104 connects to nodes 103 and 105 and generates gate control signal $V_{GC}$ based on the common mode signal $V_{COM}$ as described below in connection with FIGS. 2 and 3. Integrated circuit 100 further includes input/output circuit 106 that connects to differential terminals V+ and V−. For illustrative purposes, the invention is described in the context of an exemplary input termination resistance. It is to be understood, however, that the termination resistance according to the present invention can be used either as an input termination resistor or an output termination resistor.

In operation, control circuit 104 controls the voltage levels at $V_{GC}$ in reference to and $V_{COM}$ to maintain transistors T1 and T2 in the triode region. As thus constructed, the value of $R_{TERM}$ is given by $R_{TERM}$=R1+R(T1)+R(T2)+R2, where, R(T1) and R(T2) correspond to the channel resistance of transistors T1 and T2, respectively. In one embodiment, the combined value of the two resistors is chosen so that transistors T1 and T2 have relatively small source-drain voltages ($V_{DS}$) in order for them to remain in the triode region for a maximum differential input voltage. It is to be understood, however, that in alternative embodiments it is possible to construct the termination resistance without the inclusion of resistors R1 and R2.

The differential termination resistance according to the present invention is particularly advantageous when employed in circuit applications using low voltage differential signaling (LVDS). Each of the two differential LVDS input signals VRX+ and VRX− can be described as having two components: common-mode voltage (VCOM) and differential mode voltage (VDIFF) defined as follows:

$$V_{RX+}=V_{COM}+V_{DIFF}/2; \quad (1)$$

$$V_{RX-}=V_{COM}-V_{DIFF}/2 \quad (2)$$

Where $$V_{COM}=(V_{RX+}+V_{RX-})/2; \quad (3)$$

$$V_{DIFF}=V_{RX+}-V_{RX-} \quad (4)$$

Referring back to FIG. 1, the on-resistance of transistors T1 and T2 is determined, to a first order approximation, by the gate-source voltage, $[V_{GC}-V_{COM}]$. This is based on the assumption of small drain-to-source voltages ($V_{DS}$) for transistors T1 and T2 (as described above). Common-mode voltage, $V_{COM}$, also approximately corresponds to the middle-point of the two differential inputs of the circuit. Transistors T1 and T2 will exhibit a slight on-resistance difference and $V_{COM}$ will slightly shift away from the middle-point voltage when the differential voltage ($V_{DIFF}$) is large. However, these are considered second order effects with negligible impact on operation of the circuit as described below.

There are several factors that may cause appreciable deviations in the target resistance value of $R_{TERM}$. Among these are variations in the common-mode voltage $V_{COM}$ as well as variations in process (P), power supply voltage (V) and temperature (T) (PVT variations). Common-mode voltage $V_{COM}$ of the input signals $V_{RX+}$ and $V_{RX-}$ depends on the far-end output driver's characteristics that drives the signal onto the transmission line, the voltage induced on the transmission line and the ground plane difference between the input and output buffers. According to the present invention, control circuit 104 is designed such that when $V_{COM}$ changes, $V_{GC}$ tracks the change in order for a constant gate-source voltage and hence a constant resistance for transistors T1 and T2.

Figure 2:
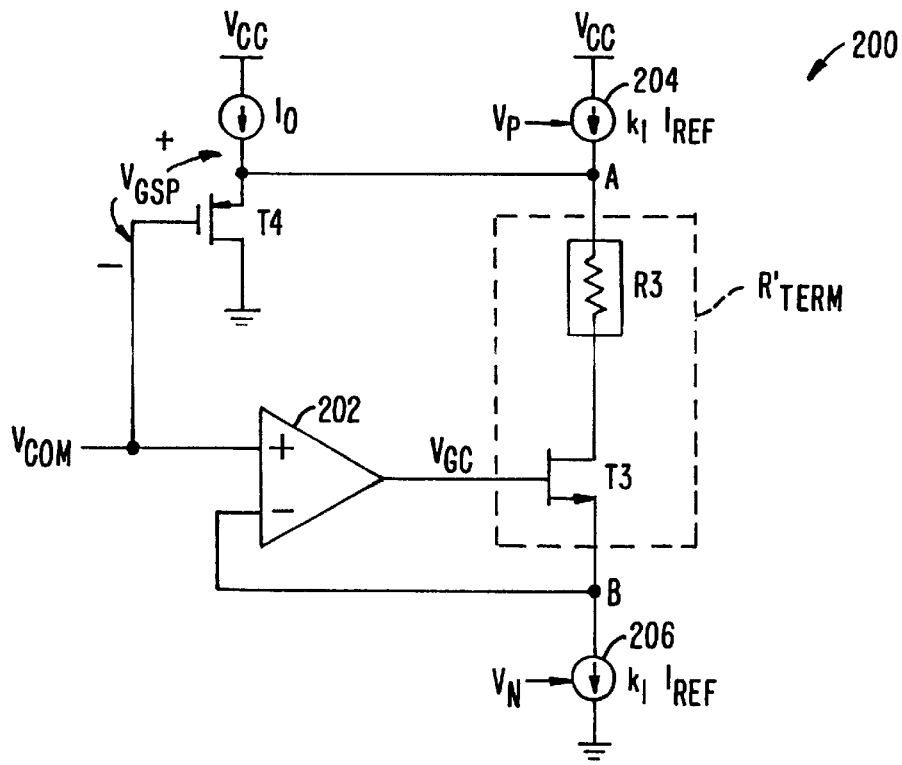
FIG. 2 illustrates an exemplary implementation for a replica biasing circuit according to an embodiment of the present invention that generates the control signal for the termination resistor of FIG. 1.

Referring to FIG. 2, there is shown an exemplary circuit implementation for a replica biasing 200 portion of control circuit 104 that generates $V_{GC}$ according to the actual level of $V_{COM}$. Replica biasing circuit 200 includes transistor T3 and resistor R3 that are serially connected between nodes A and B and replicate one half of $R_{TERM}$ 102. For area saving purposes, in one embodiment, transistor T3 is made $k_2$ times smaller ($k_2$<1) in terms of the width-to-length ratio compared to transistor T1 (or T2) in FIG. 1. Similarly, resistor R3 is formed with $k_2$ multiples of R1 (or R2). Being one half of $R_{TERM}$ 102, the tracking resistance across nodes A to B should thus be equal to ($k_2 \times R_{TERM}$)/2. It is to be understood that T3 and R3 need not be scaled and can be direct duplicates of T1(T2) and R1(R2). The gate terminal of transistor T3 is driven by the output of an operational amplifier (opamp) 202, while the source terminal (node B) of transistor T3 is connected to the inverting input of opamp 202 in a feedback arrangement. The common-mode voltage $V_{COM}$ (node 103 in FIG. 1) connects to the other (noninverting) input of opamp 202. Opamp 202 is preferably a wide-band amplifier. The output of opamp 202 driving the gate terminal of transistor T3 generates control voltage $V_{GC}$ that also drives the gate terminals of transistors T1 and T2 in FIG. 1. As thus constructed, the gate and source terminals of transistor T3 are biased identically to those of transistors T1 and T2 in FIG. 1, respectively connecting to $V_{GC}$ and $V_{COM}$. The feedback action of opamp 202 ensures that as $V_{COM}$ varies, $V_{GC}$ follows, thereby maintaining a constant gate-to-source voltage $V_{GC}$ across transistors T1, T2 and T3. Thus, circuit 200 generates a voltage level at $V_{GC}$ that is in reference to the common-mode voltage $V_{COM}$ essentially eliminating variations in $R_{TERM}$ due to variations in $V_{COM}$.

The portion of the control circuit as described thus far addresses variations in the common-mode voltage $V_{COM}$. As described above, other sources of variations that impact the value of $R_{TERM}$ include process, power supply voltage and temperature variations and input offset variations. Control circuit 104, according to the present invention, also compensates for these and other types of variations by controlling the level of voltage $V_{GC}$ in a manner that adjusts the on resistance of transistors T1 and T2 in order to maintain the total value of the termination resistance $R_{TERM}$ constant. This is achieved, according to an exemplary embodiment of the present invention, through the same replica biasing circuit given in FIG. 2 together with the reference circuit shown in FIG. 3. Referring back to FIG. 2, circuit 200 further includes a p-type transistor T4 that has its gate terminal connected to $V_{COM}$ and is biased by a current source $I_0$ connected to its source terminal forming a sourcefollower as shown. The source terminal of transistor T4 also connects to node A of the replica termination resistor. Circuit 200 further includes a first current source 204 that connects between node A and the positive power supply $V_{CC}$ and a second current source 206 that connects between node B and ground. Current source 204 is controlled by signal $V_P$ to generate a current equal to $k_1 I_{REF}$, while current source 206 is controlled by signal $V_N$ to generate the same amount of current $k_1 I_{REF}$. Control signals $V_P$ and $V_N$ are generated by reference circuit 300 shown in FIG. 3.

Referring to FIG. 2, the value of the tracking resistance $R'_{TERM}$ (=$k_2 \times R_{TERM}/2$) can be given in terms of the gate-to-source voltage $V_{GSP}$ of the p-type transistor T4 and the reference current $I_{REF}$. Opamp 202 operates such that the voltage at its two inputs are virtually the same. Therefore, the voltage across the source and gate terminals of transistor T4 (i.e., $V_{GSP}$) is equivalent to the voltage across nodes A and B (i.e., $V_{AB}$). as follows. Accordingly, $R'_{TERM}$ can be give by:

$$R'_{TERM}=(k_2 R_{TERM})/2=V_{GSP}/(k_1 I_{REF}) \quad (5)$$

From the above, the value of $R_{TERM}$ can be derived as follows:

$$R_{TERM}=2V_{GSP}/(k_1 k_2 I_{REF}) \quad (6)$$

Figure 3:
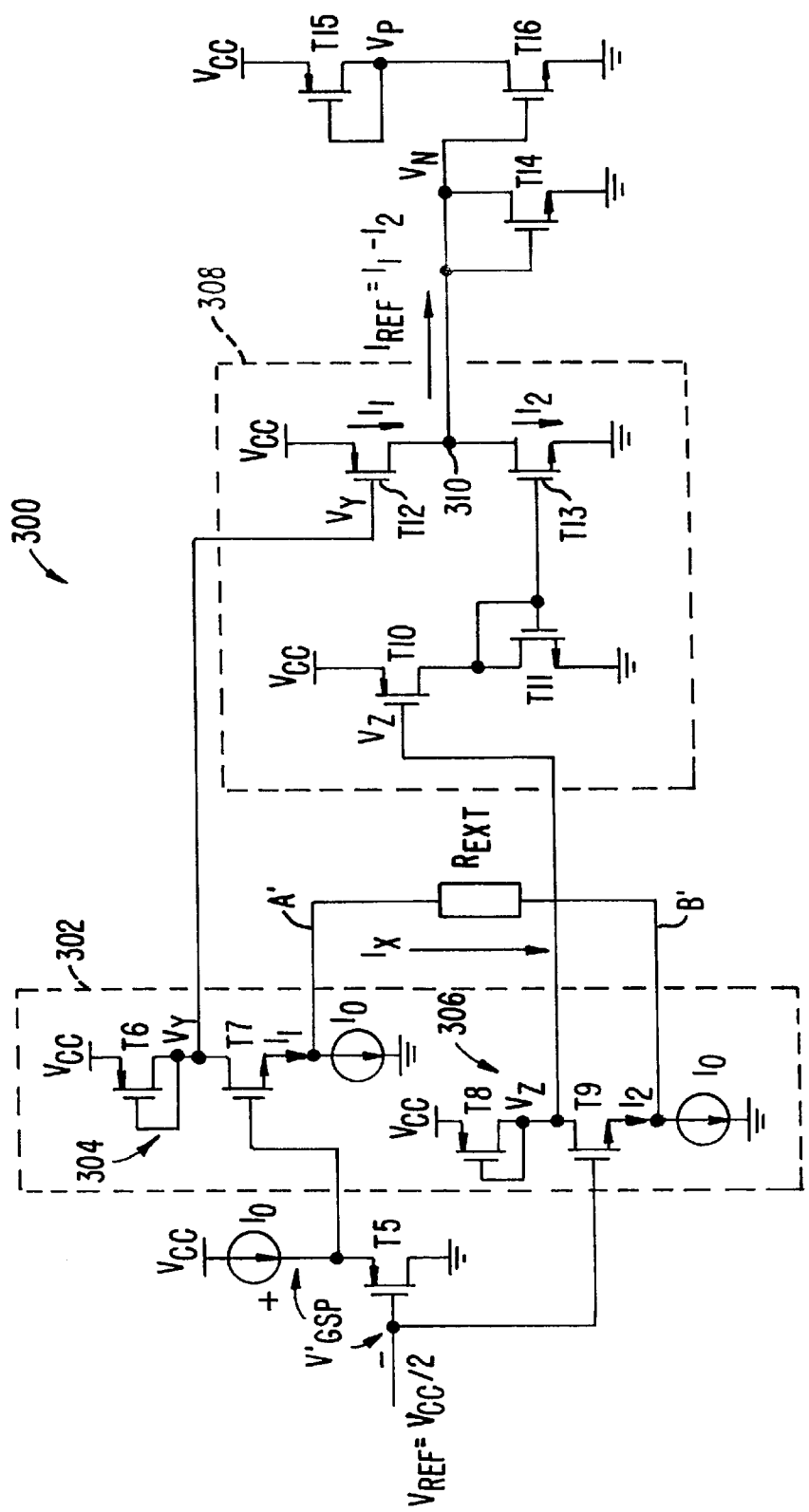
FIGS. 3 presents an exemplary implementation for a reference circuit used in connection with the replica biasing circuit of FIG. 2 and the termination resistor of FIG. 1.

The present invention next renders $R_{TERM}$ entirely independent of internal circuit parameters $V_{GSP}$ and $I_{REF}$ by generating an $I_{REF}$ that tracks $V_{GSP}$ so that these terms are canceled from the above equation (6). In a specific embodiment, this is accomplished by first generating a replica $V_{GSP}$ (i.e., $V'_{GSP}$) and then generating the $I_{REF}$ based on $V'_{GSP}$. Referring to FIG. 3, there is shown an exemplary circuit implementation for a reference circuit 300 that accomplishes this task and controls the biasing of circuit 200. Reference circuit 300 includes a p-type transistor T5 that is connected in a source-follower configuration in a similar fashion as p-type transistor T4 of circuit 200 and is biased by the current $I_0$ such that its gate-to-source voltage Vgs is the same as that of transistor T4, i.e., $V_{GSP}=V'_{GSP}$. A reference signal $V_{REF}$ is connected to the gate terminal of transistor T5. The reference voltage $V_{REF}$ is arbitrarily set to $V_{CC}/2$ but may be any voltage around the mid-point between ground and $V_{CC}$. The voltage $V'_{GSP}$ is applied across an external resistor $R_{EXT}$ connected to nodes A' and B' via circuit 302. Circuit 302 includes a first buffer 304 and a second buffer 306 that essentially convert a voltage signal to a current signal. Buffers 304 and 306 are both biased by a constant current source $I_0$, but transistor T7 in buffer 304 connects to the source terminal of transistor T5, while transistor T9 in buffer 306 connects to the gate terminal of transistor T5. This results in current $I_1$ flowing in transistor T7 that is different than current $I_2$ flowing in transistor T9. As thus constructed, the operation of circuit 300 yields the following:

$$V'_{GSP}=V_{GSP}=V_{A'B'}=I_X R_{EXT} \quad (7)$$

where, $I_X$ is the current flowing through $R_{EXT}$, which can be derive as follows:

$$I_1=I_0+I_X \quad (8)$$

$$I_2=I_0-I_X \quad (9)$$

From equations (8) and (9).

$$I_X=(I_1-I_2)/2 \quad (10)$$

Reference circuit 300 further includes a current difference circuit 308 that includes transistors T12 and T13 that are biased so that they carry currents $I_1$ and $I_2$, respectively. The drain terminals of transistors T12 and T13 are connected at node 310 so that the difference between currents $I_1$ and $I_2$ flows out of node 310. This current is then used as the reference current $I_{REF}$ in replica bias circuit 200 of FIG. 2. That is, node 310 connects to transistors T14, T15 and T16 that generate bias voltages $V_N$ and $V_P$ that are then applied to the control inputs of current sources 206 and 204, respectively, as show in FIG. 2. This results in:

$$I_{REF}=(I_1-I_2)=2I_X \quad (11)$$

Combining equations (7) and (11) results in:

$$I_{REF}=2(V_{GSP}/R_{EXT}) \quad (12)$$

Going back to equation (6) and replacing $I_{REF}$ with the expression in equation (12) yields:

$$R_{TERM}=2V_{GSP}[2(k_1 k_2)(V_{GSP}/R_{EXT})] \quad (13)$$

Which can be simplified as:

$$R_{TERM}=R_{EXT}/(k_1 k_2) \quad (14)$$

Thus, the value of termination resistance $R_{TERM}$ is made dependent on the value of the external resistor $R_{EXT}$ and the constants $k_1$ and $k_2$. That is, the termination resistance $R_{TERM}$, according to this embodiment of the present invention, is defined by an external resistor, regardless of other conditions internal to the circuit or those of the signals received by the circuit. Suitable values for $k_1$ and $k_2$ may be selected in order to achieve an optimum trade-off between area and power consumption. The value of $R_{EXT}$ may vary depending on the application. For LVDS applications, for example, termination resistance $R_{TERM}$ is 100 Ohms, allowing the designer to select, e.g., $K=k_1 k_2=500$ and $R_{EXT}=50$ Kilo Ohms. It is to be understood that different differential I/O standards may require different termination resistance, and that $R_{EXT}$ would therefore vary accordingly. In one embodiment, a variable resistor implements $R_{EXT}$ to allow for fine tuning and tweaking of the value of $R_{TERM}$. In another embodiment, the capability to adjust the value of the termination resistance based on an external resistor provides for a finely controlled variable differential termination resistance that is suitable for, e.g., multi-standard I/O applications. The accuracy for $R_{EXT}$ also varies depending on the I/O requirements. For LVDS applications, for example, $R_{EXT}$ is selected such that it results in an $R_{TERM}$ with ±10% tolerance.

In some applications, an integrated circuit may include multiple differential I/O terminals. In such applications, a replica biasing circuit 200 shown in FIG. 2 may be used for each pair of differential input signals. However, one replica biasing circuit 200 may be shared by two or more of I/O differential pairs that have the same common-mode voltage. The same common-mode voltage may be shared by, for example, multiple input signals that are driven by the output buffers of the same kind and carried by the transmission lines with the same characteristics. Reference circuit 300 shown in FIG. 3 provides a tracking current for any number of the replica biasing circuits used for multiple different differential input pairs.

Figure 4:
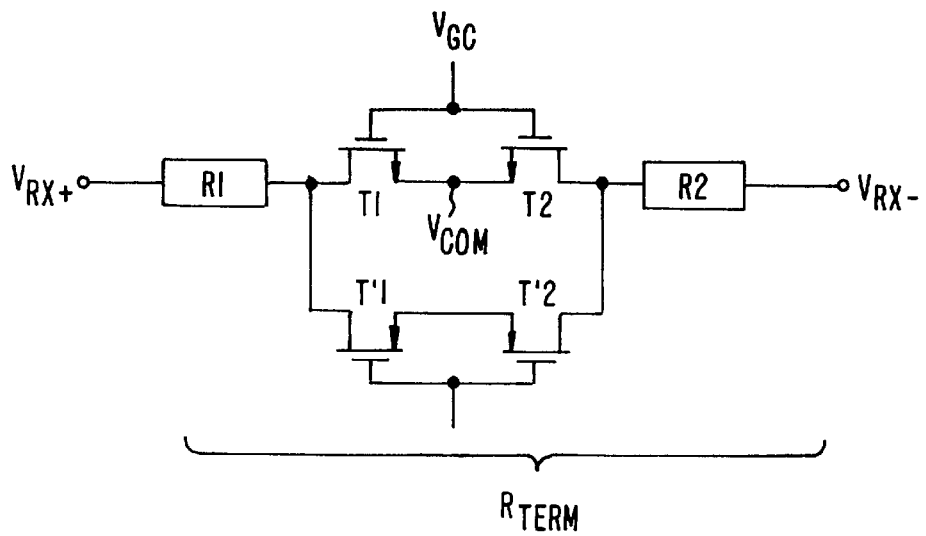
FIG. 4 is a simplified diagram of an alternative embodiment for the differential termination resistance according to the present invention.

In an alternative embodiment of the present invention, the voltage range of operation for the circuit is extended by adding p-type transistors in parallel with the n-type termination transistors. For those input signals with a high-level common-mode voltage close to the maximum value of, e.g., 2.4V (for LVDS), the gate control voltage $V_{GC}$ may saturate at the power supply voltage $V_{CC}$. This could happen especially when $V_{CC}$ is low, e.g. $V_{CC}=3.3V$. In such a case, it is desirable to employ additional p-type transistors in parallel with the n-type transistors for extended control. FIG. 4 is a simplified diagram of the termination resistance $R_{TERM}$ showing the addition of p-type transistors $T_1'$ and $T_2'$ in parallel with n-type transistors T1 and T2. In this embodiment, the tracking termination resistance ($R'_{TERM}$ in FIG. 2) would also include p-type transistor connected in parallel with the n-type transistor. The gate control signals of p-type transistors $T_1'$ and $T_2'$ can be derived from a similar but separate feedback arrangement. However, for less complexity and reduced specifications, the gates of the p-type transistors can alternatively be connected to ground.

In conclusion, the present invention provides a termination resistance the value of which is defined accurately with an external reference resistor, independent of variations in circuit parameters and signal conditions including input signal common-mode voltage, as well as processing, power supply voltage and temperature variations. The invention provides for a self-tracking mechanism that tracks these variations and automatically makes adjustment to keep the termination resistance unchanged. The invention therefore eliminates any need for expensive process and post-process tweaking. Furthermore, by adjusting the value of the external reference resistor, the invention allows the termination resistance to easily be adapted to match different line resistances. This has been accomplished with minimum device count and circuit complexity. While the above provide detailed description of specific embodiments, it is to be understood that various alternatives, equivalents and modifications are possible. Therefore, the scope of the invention should not be limited to the illustrative embodiments described, and should instead be determined by the following claims and their full breadth of equivalents.

What is claimed is:

1. An integrated differential termination resistance coupled between a first node and a second node, comprising:
    a first field effect transistor (FET) coupled between the first node and a common node;
    a second FET coupled between the second node and the common node, wherein source terminals of the first and second FETs couple to the common node; and
    a termination control circuit coupled to gate terminals of the first and second FETs and the common node, and configured to track variations in a replica termination resistance and to compensate for the variation by adjusting a control voltage at the gate terminals of the first and second FETs.

2. The integrated differential termination resistance of claim 1 wherein the termination control circuit comprises a feedback circuit coupled between the replica termination resistance and the common node, the feedback circuit being configured to adjust the control voltage in response to variations in a common-mode voltage at the common node.

3. The integrated differential termination resistance of claim 2 wherein the replica termination resistance comprises a third FET having a gate terminal coupled to the control voltage, and
    wherein, the feedback circuit comprises an operational amplifier having a first input coupled to the common node, a second input coupled to a source terminal of the third FET and an output coupled to the gate terminal of the third FET.

4. The integrated differential termination resistance of claim 1 wherein the replica termination resistance comprises a third FET having a gate terminal coupled to the control voltage and a source terminal coupled to the common node.

5. The integrated differential termination resistance of claim 4 wherein the termination control circuit further comprises a replica biasing circuit coupled to the replica termination resistance and configured to vary the control voltage to maintain a substantially constant on resistance for the third FET.

6. The integrated differential termination resistance of claim 5 wherein the replica biasing circuit comprises:
    an external resistor; and
    a reference circuit coupled to the external resistor and the replica termination resistance, and configured to generate a reference current for the third FET whose value is given by a voltage across the replica termination resistance divided by a value of the external resistor.

7. The integrated differential termination resistance of claim 3 further comprising:
    a first resistive element coupled between a drain terminal of the first FET and the first node; and
    a second resistive element coupled between a drain terminal of the second FET and the second node.

8. The integrated differential termination resistance of claim 7 wherein the replica termination resistance comprises a third resistive element coupled to a drain terminal of the third FET.

9. The integrated differential termination resistance of claim 1 wherein the first and second FET are n-type transistors.

10. The integrated differential termination resistance of claim 9 further comprising:
    a first p-type FET coupled in parallel to the first FET; and
    a second p-type FET coupled in parallel to the second FET.

11. The integrated differential termination resistance of claim 4 wherein the third FET in the replica termination resistance is n-type, and wherein the replica termination resistance further comprises a p-type FET coupled in parallel to the third FET.

12. The integrated differential termination resistance of claim 6 wherein the reference circuit comprises:
    a voltage replicating circuit coupled across the external resistor, and configured to replicate the voltage across the replica termination resistance; and
    a current difference circuit coupled to the voltage replicating circuit and configured to generate the reference current based on an amount of current flowing through the external resistor.

13. The integrated differential termination resistance of claim 3 wherein the termination control circuit further comprises a replica biasing circuit coupled to the replica termination resistance and configured to vary the control voltage to maintain a substantially constant on resistance for the third FET.

14. The integrated differential termination resistance of claim 13 wherein the replica biasing circuit comprises:
    an external resistor; and
    a reference circuit coupled to the external resistor and the replica termination resistance, and configured to generate a reference current for the third FET whose value is given by a voltage across the replica termination resistance divided by a value of the external resistor.

15. The integrated differential termination resistance of claim 14 wherein the reference circuit comprises:
    a voltage replicating circuit coupled across the external resistor, and configured to replicate the voltage across the replica termination resistance; and
    a current difference circuit coupled to the voltage replicating circuit and configured to generate the reference current based on an amount of current flowing through the external resistor.

16. The integrated differential termination resistance of claim 15 wherein the third FET replicates either one of the first or second FET, but is smaller in size by a predetermined factor.

17. A method of implementing a differential termination resistance comprising:

coupling source and drain terminals of a first field effect transistor (FET) across differential terminals, respectively;

operating the first FET in a triode region such that its channel provides an adjustable termination resistance;

tracking variations from a target value of the termination resistance via a replica termination resistance; and automatically adjusting a resistance value of the first FET by varying a gate voltage of the FET to compensate for the tracked variations.

18. The method of claim 17 wherein the replica termination resistance comprises a second FET, and wherein, the step of tracking variations comprises recreating a biasing condition of the first FET across the second FET.

19. The method of claim 18 wherein the step of automatically adjusting comprises:

generating a reference current based on a voltage across the second FET and an external resistive element; and biasing the second FET using the reference current.

20. An integrated differential termination resistance coupled between a first node and a second node, comprising:

a first resistive element coupled to the first node;

a first field effect transistor (FET) coupled between the first resistive element and a common node;

a second resistive element coupled to the second node;

a second FET coupled between the second resistive element and the common node, wherein source terminals of the first and second FETs couple to the common node;

an external resistor; and a termination control circuit coupled to gate terminals of the first and second FETs and the common node, and coupled to the external resistor, wherein, the external resistor sets a value of the integrated differential termination resistance.

21. The integrated differential termination resistance of claim 20 wherein the termination control circuit tracks variations in a replica termination resistance and compensates for the variations by adjusting a control voltage at the gate terminals of the first and second FETs.

* * * * *

UNITED STATES PATENT AND TRADEMARK OFFICE
CERTIFICATE OF CORRECTION

PATENT NO.     : 6,590,413 B1
DATED          : July 8, 2003
INVENTOR(S)    : Yang It is certified that error appears in the above-identified patent and that said Letters Patent is hereby corrected as shown below:

<u>Title page,</u>
Item [56], References Cited, U.S. PATENT DOCUMENTS, insert:
-- 6,147,520 A   11/2000   Kothandaraman et al. --

Signed and Sealed this

Sixteenth Day of March, 2004

JON W. DUDAS
*Acting Director of the United States Patent and Trademark Office*